United States Patent [19]

Wirsbinski

[11] 4,199,054
[45] Apr. 22, 1980

[54] DOOR OPENING MECHANISM FOR FEED CONVEYOR

[75] Inventor: James L. Wirsbinski, Marshfield, Wis.

[73] Assignee: Berg Equipment Corporation, Marshfield, Wis.

[21] Appl. No.: 928,478

[22] Filed: Jul. 27, 1978

[51] Int. Cl.² .................................................. B65G 19/28
[52] U.S. Cl. .......................................... 198/735; 49/109;
49/329; 119/32 B; 198/366; 198/530; 198/861;
222/556
[58] Field of Search ............... 198/366, 530, 531, 532,
198/73 S, 861; 49/94, 106, 109, 357, 329;
119/31 CF, 32 B, 36 R; 222/556

[56] References Cited

U.S. PATENT DOCUMENTS 4,136,769   1/1979   Dostal .................................. 198/861

Primary Examiner—Robert B. Reeves
Assistant Examiner—Douglas D. Watts
Attorney, Agent, or Firm—Wheeler, Morsell, House & Fuller

[57] ABSTRACT

A door opener mechanism for the side doors in a feed or grain elevator or conveyor in which the doors are hinged to the sides of the conveyor includes a crank arm pivotally connected to the conveyor at a point intermediate the side walls to provide rotation of the crank arm about a vertical axis. The crank arm is connected to the hinged doors by links and the crank arm is connected to a control arm by a link. The control arm is arranged to be connected to ropes for remote control of the door opening device. The control mechanism employed provides a relatively low profile, thus enabling placement of the conveyor and door opening mechanism close to a ceiling, which is desirable in places of limited space such as old barns.

1 Claim, 3 Drawing Figures

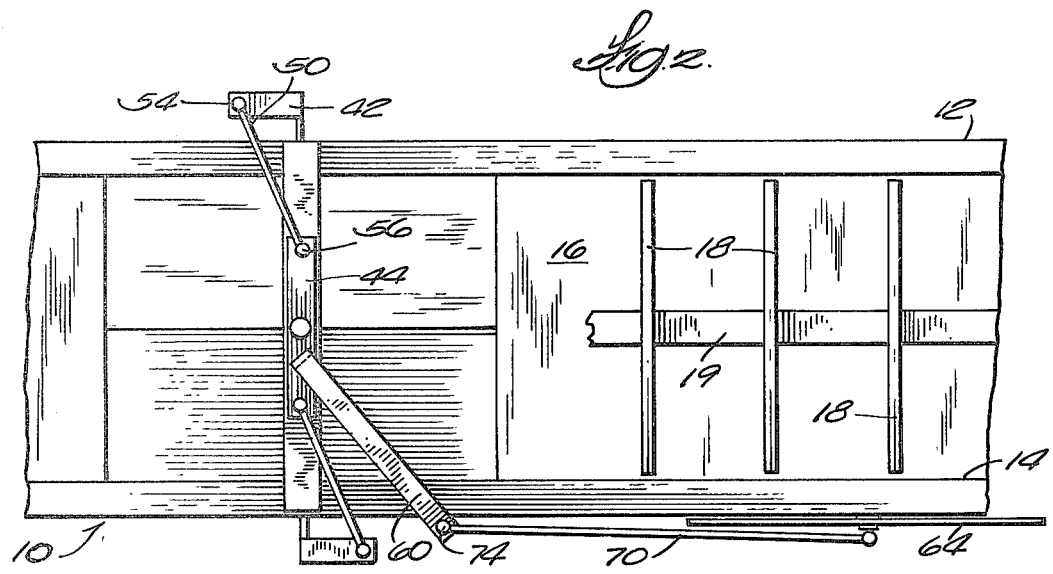
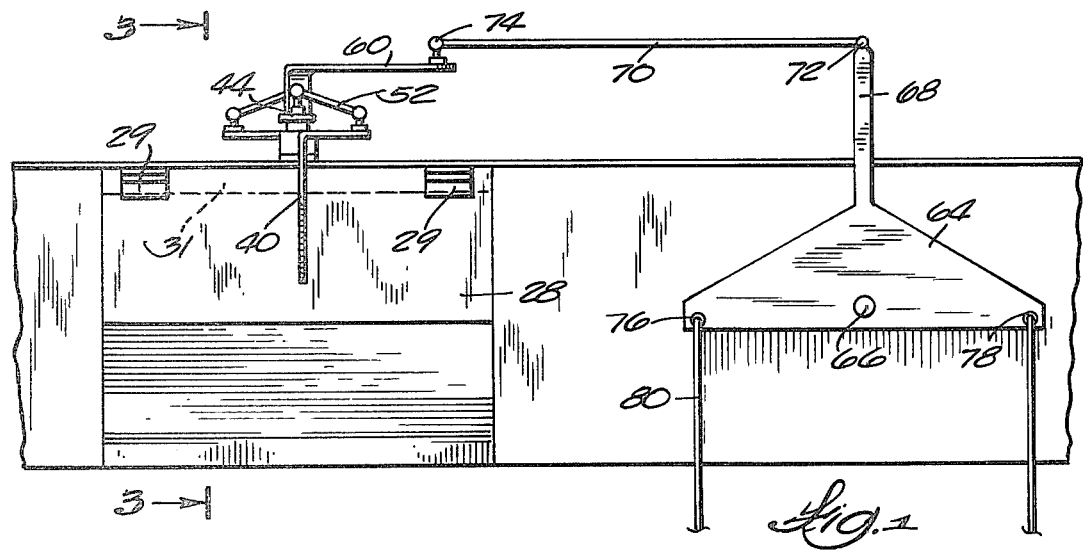
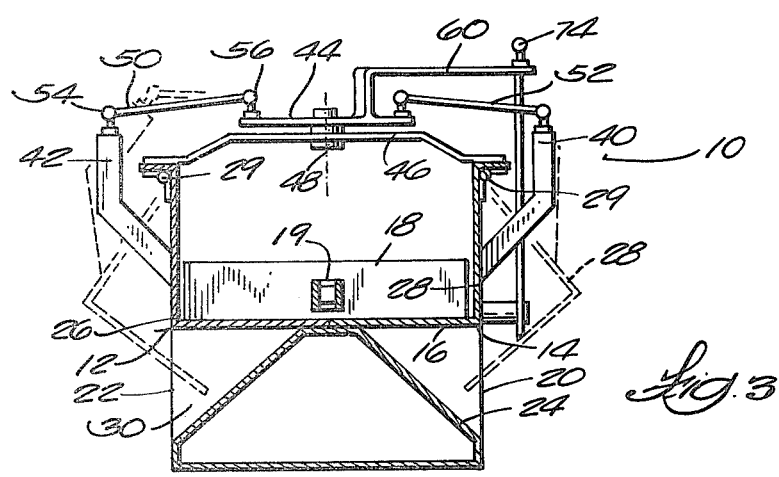

DOOR OPENING MECHANISM FOR FEED CONVEYOR

BACKGROUND OF THE INVENTION

In conveying systems employed in livestock barns, supply conveyors are typically used between the silo and the conveyor feed belts which run longitudinally of the barn and supply the feed alleys or bunk feeders. There may be one or more feed alleys or feed conveyors in a barn. If it is desired to discharge grain from the supply conveyor at a point intermediate the length of the conveyor, a drop out mechanism with doors is positioned at the appropriate location to discharge the feed into a feed alley or feed conveyor. Typically, the supply conveyor is located adjacent the ceiling of the barn and at an inconvenient location for easy access to the drop out doors. Accordingly, remote control is desirable to manipulate the doors at the desired time. Some of the supply conveyors in use have sliding doors. The present invention deals with mechanism for opening and closing hinged doors which, in the closed position, interfit in the side walls of the conveyor to close the door openings and, in the open position, permit feed to be discharged laterally and downwardly from the door openings. The present invention relates to a low profile door opening mechanism which enables close positioning of the top of the conveyor to the ceiling of a barn or other structure.

SUMMARY OF THE INVENTION

The invention provides door opening mechanism for a supply conveyor which is adapted to be employed with hinged doors which form the side walls of the conveyor. The hinged doors are located oppositely and each is provided with upstanding brackets. A crank arm is pivotally connected to a cross brace for rotation about a vertical axis approximately centered over the conveyor. The crank arm is pivotally connected by links and flexible joints to the door brackets. A control arm is pivotally connected to a side wall of the conveyor and is connected by a link to the crank arm at a point intermediate the distance between the crank arm pivot and one of the connections to a door opening link. The control arm is apertured for connection to cables or ropes which can be employed for remote control of the device. The overhead clearance required for the door opening mechanism is minimal.

Further objects, advantages and features of the invention will become apparent from the disclosure.

DESCRIPTION OF THE DRAWINGS

FIG. 1 is a side elevational view of door opening mechanism in accordance with the invention.

FIG. 2 is a plan view of the apparatus shown in FIG. 1.

FIG. 3 is a sectional view along line 3—3 of FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As best illustrated in FIG. 3, the conveyor 10 is provided with side walls 12 and 14. The conveyor has a conveyor bed 16, illustrated in FIG. 2 and in FIG. 1 with a broken line, upon which a plurality of spaced flights 18 are supported for travel. The flights are connected to a chain 19 (FIG. 2). The flights and chain make an elongated loop and return beneath the conveyor bed.

To provide discharge of material from the conveyor 10 at a point intermediate the length of the conveyor, the side walls 12 and 14 are provided with oppositely located openings 20 and 22 at a suitable location to discharge feed off a V-shaped bottom section 24 of the conveyor for discharge into a bunk feeder or the like. The openings 20 and 22 are closed by L-shaped doors 26 and 28 (FIG. 3), and the doors are movable from the solid line position to the broken line position about hinged connections 29 to frame members 31 which are connected to the side walls and span the openings 20, 22. In the broken line position the doors are open, permitting feed to escape at the zone 30 beneath the doors. When the doors are closed they form the base for the conveyor bed and prevent discharge of feed.

In accordance with the invention, means for provided for opening the doors. In the disclosed construction, the means includes brackets 40 and 42 which are welded at one end to the doors. A crank arm 44 is provided which is pivotally supported to a cross brace 46 for rotation about a vertical axis 48 intermediate the width of the conveyor. The crank arm 44 is connected to the brackets 42 and 40 by links 50 and 52 and flexible, universal couplings or ball joints 54 and 56. The crank arm 44 is provided with a handle portion 60 which can be operated by a control arm 64 which is pivotally connected at 66 to the side wall of the conveyor. The control arm 64 has a projecting portion 68 which is connected to a link 70 by a ball joint 74. The control arm 64 can be provided with apertures at 76 and 78 for connection to ropes or cables 80 for remote control operation of the door opener.

What is claimed is:

1. In a drop out device located intermediate the ends of a conveyor and including doors hinged to side walls of the conveyor for movement about horizontal axes to enable material carried by the conveyor to be discharged at a point intermediate the ends of the conveyor, the improvement comprising means to open and close said doors, said means including a crank arm, means pivotally connecting the crank arm to the conveyor top wall between the doors for pivotal movement about a vertical axis, brackets on said doors, said brackets extending outwardly and upwardly from the point of connection with the doors to a point above said conveyor side walls, and link means including couplings connecting said brackets to ends of said crank means to afford vertical movement of said link means in addition to horizontal displacement, and control means connected to said crank means to pivot said crank means and cause opening and closing of said doors, said control means comprising a control arm pivotally connected to a side wall of said conveyor at a point spaced from said doors for swinging movement about a horizontal axis, said control arm having means spaced from said control arm pivot on opposite sides of said pivot for connection to remotely operable means, and a rigid link connecting said control arm to said crank means whereby rotation of said control arm will cause pivotal movement of said crank arm.

* * * * *